(12) United States Patent
Yuan et al.

(10) Patent No.: US 8,728,628 B2
(45) Date of Patent: May 20, 2014

(54) PASSIVANT FOR HOT-DIP AL-ZN-COATED SHEET AND PREPARATION METHOD AND USE THEREOF

(75) Inventors: Ping Yuan, Sichuan (CN); Taixiong Guo, Sichuan (CN); Quan Xu, Sichuan (CN); Dan Yu, Sichuan (CN); Yong Zhang, Sichuan (CN); Zhefeng Xu, Panzhihua (CN); Yilin Zhou, Sichuan (CN)

(73) Assignees: Pangang Group Steel Vanadium and Titanium Co., Ltd., Panzhihua, Sichuan (CN); Pangang Group Research Institute Co., Ltd., Chengdu, Sichuan Province (CN); Pangang Group Panzhihua Iron & Steel Research Institute Co., Ltd., Panzhihua, Sichuan (CN)

( * ) Notice: Subject to any disclaimer, the term of this patent is extended or adjusted under 35 U.S.C. 154(b) by 24 days.

(21) Appl. No.: 13/126,751

(22) PCT Filed: Apr. 7, 2010

(86) PCT No.: PCT/CN2010/071589
§ 371 (c)(1),
(2), (4) Date: Aug. 11, 2011

(87) PCT Pub. No.: WO2011/020328
PCT Pub. Date: Feb. 24, 2011

(65) Prior Publication Data
US 2012/0135267 A1    May 31, 2012

(30) Foreign Application Priority Data
Aug. 21, 2009  (CN) .......................... 2009 1 0305921

(51) Int. Cl.
| | | |
|---|---|---|
| B32B 15/08 | (2006.01) | |
| B05D 3/00 | (2006.01) | |
| B05D 3/02 | (2006.01) | |
| C09K 15/32 | (2006.01) | |
| B05D 7/14 | (2006.01) | |

(52) U.S. Cl.
USPC ... 428/626; 524/406; 252/389.3; 252/389.31; 427/327

(58) Field of Classification Search
USPC .......... 428/626; 252/389.3, 389, 31; 427/327; 524/406
See application file for complete search history.

(56) References Cited

FOREIGN PATENT DOCUMENTS

| CN | 1247777 A | 3/2000 |
|---|---|---|
| CN | 1268583 A | 10/2000 |
| CN | 1511908 A | 7/2004 |
| CN | 101332692 A | 12/2008 |
| CN | 101629288 A | 1/2010 |
| KR | 20030021774 A | 3/2003 |
| KR | 20040108110 A | 12/2004 |
| WO | WO 01/92598 A1 | 12/2001 |
| WO | WO 0192598 A1 * | 12/2001 |
| WO | WO 2009/084849 A2 | 7/2009 |
| WO | WO 2009084849 A2 * | 7/2009 |

OTHER PUBLICATIONS

Gong Li, Lu Yan-Ping, Yu Yang, "Corrosion Resistance of Nano Silicon Sol-modified Organic Composite Film",, http://www.eqvip.com, Sep. 7, 2004, pp. 18-20.
Zhang Jun-Xi, Qiao Yi-Nan, Cao Chu-Nan, Zhang Jian-Qing, "Effect of Additives on Growth and Properties of the Passivating Film Formed on 304 Stainless Steel by A.V. Passivation", http://www.eqvip.com, Aug. 2002, pp. 335-339, vol. 23, No. 8.
PCT International Search Report for PCT Counterpart Application No. PCT/CN2010/071589 containing Communication relating to the Results of the Partial International Search Report, 6 pgs., (Jul. 15, 2010).

* cited by examiner

Primary Examiner — Michael Bernshteyn
(74) Attorney, Agent, or Firm — Blakely, Sokoloff, Taylor & Zafman LLP

(57) ABSTRACT

The present invention provides a passivant for hot-dip Al—Zn-coated sheet of which the raw materials include: 2~6 parts by weight of water soluble molybdate, 4~12 parts by weight of water soluble manganese salt, 50~100 parts by weight of basic silica sol and 50~100 parts by weight of water soluble organic resin. The present invention also provides a method to prepare the passivant for hot-dip Al—Zn-coated sheet including the following steps: adding and dissolving water soluble molybdate and water soluble manganese salt into deionized water; adding basic silica sol into the solution and mixing well; adding water soluble organic resin into the solution and mixing well; regulating the pH value of the solution to 5~8 by using phosphoric acid. The present invention also provides a hot-dip Al—Zn-coated sheet treated with the present passivant and a method to passivate hot-dip Al—Zn-coated sheet.

13 Claims, No Drawings

PASSIVANT FOR HOT-DIP AL-ZN-COATED SHEET AND PREPARATION METHOD AND USE THEREOF

CROSS-REFERENCE TO RELATED APPLICATIONS

This patent application is a U.S. National Phase application under 35 U.S.C. §371 of International Application No. PCT/CN2010/071589, filed on Apr. 7, 2010, entitled PASSIVATION TREATMENT AGENT FOR HOT-DIP ALUMINUM-ZINC PLATED SHEET AND PRODUCTION METHOD AND USE THEREOF, which claims priority to Chinese Patent Application No. 200910305921.8, filed on Aug. 21, 2009.

FIELD OF THE INVENTION

The present invention pertains to the field of surface chemical treatment and particularly relates to a passivant for hot-dip Al—Zn-coated sheet and preparation method and use thereof.

BACKGROUND OF THE INVENTION

Due to the desirable corrosion resistance and high-temperature oxidation resistance of hot-dip Al—Zn-coated sheet, their application is being extended from the field of construction materials to higher-level fields, such as: home appliances. In humid environment, Al—Zn alloy layer is vulnerable to corrosion and white rust or black spots may be formed on its surface, impairing the surface quality and corrosion resistance of hot-dip Al—Zn-coated sheet. In order to further improve the corrosion resistance of hot-dip Al—Zn-coated sheet, its surface is conventionally passivated.

For example, patent application CN 101332692A discloses a hot-dip Al—Zn-coated chromium-free passivated steel sheet and its preparation method. This steel sheet has a film formed mainly by ammonium fluorotitanate and ammonium meta-vanadate in combination of passivation with phosphorus compound. However, the treating agent provided in this method is totally inorganic, the film is thin and has no improvement on substrate, its self-lubricating ability is poor and the use of vanadium also causes the problem in relation to environmental protection.

For another example, patent application CN 1247777A discloses a method to treat hot-dip Al—Zn-coated sheet with chromium-containing organic resin composition. The resin film formed on the surface of Al—Zn-coated sheet may prevent appearance damage of the Al—Zn-coated sheet during molding, but the existence of chromium will cause environmental pollution.

For another example, patent application CN 1511908A discloses a waterborne resin composition used to treat Al—Zn alloy coated steel sheet. It contains anionic water-dispersible polyurethane, silane coupling agent and water-soluble zirconium compound. The drying temperature is 70~220° C. Nevertheless, the water-soluble zirconium compound (ammonium zirconium carbonate) used in this method has poor thermal stability and is quickly decomposed at 60° C.; moreover, this method also uses silane coupling agent, which further increases the cost of this method.

SUMMARY OF THE INVENTION

The technical problem the present invention seeks to solve is to provide a passivant for hot-dip Al—Zn-coated sheet, which has low cost and no environmental pollution.

The raw materials of the passivant of the present invention for hot-dip Al—Zn-coated sheet include: 2~6 parts by weight of water soluble molybdate, 4~12 parts by weight water soluble manganese salt, 50~100 parts by weight basic silica sol and 50~100 parts by weight water soluble organic resin.

The foregoing water soluble molybdate may be any suitable molybdate, such as: at least one of sodium molybdate, ammonium molybdate and potassium molybdate.

The foregoing water soluble manganese salt may be any suitable water soluble manganese salt, such as: at least one of manganese dihydrogen phosphate, manganese sulfate, manganese chloride and manganese nitrate.

If the concentration of basic silica sol is too low, the corrosion resistance and water resistance of the passivant will be affected; if its concentration is too high, the formed passivated film will contain excessive silicon dioxide, the appearance of the passivated film will be affected and its surface will turn white. In order that the passivant of the present invention for hot-dip Al—Zn-coated sheet has an even better effect, the basic silica sol containing 20~40 wt % silicon dioxide is preferred.

The water soluble organic resin may be any suitable water soluble organic resin, such as: at least one of water soluble styrene-acrylic resin emulsion, water soluble silicone-acrylic emulsion and water soluble acrylic resin. The resins all have glass transition temperature (Tg) of ≤50° C. and may improve the forming performance, corrosion resistance and water resistance of the film formed by the passivant of the present invention.

The styrene-acrylic resin may be any styrene-acrylic resins that can be used in coatings. Its molecular weight may vary in a very large range. For example, the weight-average molecular weight of the styrene-acrylic resin may be 200-3000, preferably 200-1000 and more preferably 300-800.

The styrene-acrylic resin contains a structural unit formed by styrene-based monomers and a structural unit formed by acrylic-based monomers and/or acrylate-based monomers. The molar ratio between the structural units may vary in a very large range. For example, the molar ratio between the structural unit formed by styrene-based monomers and the structural unit formed by acrylic-based monomers and/or acrylate-based monomers may be 1:0.02-50.

The styrene-based monomer may be one or more selected from styrene, 2-methyl styrene, 3-methyl styrene, 4-methyl styrene, 4-ethyl styrene, 4-tertiary butyl styrene, 2,4-dimethyl styrene, α-methyl styrene and α-methyl-4-methyl styrene.

The acrylic-based monomer may be one or more selected from acrylic acid, methacrylic acid and trimethacrylic acid.

The acrylate-based monomer may be one or more selected from methyl acrylate, ethyl acrylate, n-butyl acrylate, iso-butyl acrylate, n-octyl acrylate, 2-ethylhexyl acrylate, hydroxy-ethyl acrylate, hydroxy-propyl acrylate, glycidyl acrylate, methyl methacrylate, ethyl methacrylate, n-butyl methacrylate, hexyl methacrylate, n-octyl acrylate, laurate methacrylate, octadecyl methacrylate, hydroxyethyl methacrylate, hydroxypropyl methacrylate, glycidyl methacrylate and trihydroxymethylpropyl trimethylacrylate.

The styrene-acrylic resin emulsion that meets the foregoing conditions is commercially available, for example: the xy-108b styrene-acrylic emulsion produced by Guangzhou Chaolong Chemical Technology Co., Ltd. and the A-101 styrene-acrylic emulsion produced by Nantong Lianbang Chemical Co., Ltd.

The styrene-acrylic resin that meets the foregoing conditions may also be produced by conventional polymerization method, for example: at the presence of catalyst, the styrene-based monomers and the acrylic-based monomers and/or acrylate-based monomers are subjected to emulsion copolymerization. Conventional catalysts and copolymerization conditions may be adopted.

The water soluble silicone-acrylic emulsion is an emulsion containing silicone-acrylic resin. The silicone-acrylic resin may be any silicone-acrylic resin that can be used in coatings. Its molecular weight may vary in a very large range. For example, the weight-average molecular weight of the silicone-acrylic resin may be 200-3000, preferably 200-1000 and more preferably 300-800.

The silicone-acrylic resin may contain a structural unit formed by organosilicon monomers and a structural unit formed by acrylic-based monomers and/or acrylate-based monomers. The molar ratio between the structural units may vary in a very large range. For example, the molar ratio between the structural unit formed by organosilicon monomers and the structural unit formed by acrylic-based monomers and/or acrylate-based monomers may be 1:0.02-50.

The organosilicon monomer may be one or more selected from methyl chlorosilane, phenyl chlorosilane, methylvinyl chlorosilane, ethyl trichlorosilane, propyl trichlorosilane, vinyl trichlorosilane and y-chloropropyl trichlorosilane.

The acrylic-based monomer may be one or more selected from acrylic acid, methacrylic acid and trimethacrylic acid; the acrylate monomer may be one or a plurality of methyl acrylate, ethyl acrylate, n-butyl acrylate, iso-butyl acrylate, n-octyl acrylate, 2-ethylhexyl acrylate, hydroxy-ethyl acrylate, hydroxy-propyl acrylate, glycidyl acrylate, methyl methacrylate, ethyl methacrylate, n-butyl methacrylate, n-hexyl methacrylate, n-octyl acrylate, laurate methacrylate, octadecyl methacrylate, hydroxyethyl methacrylate, hydroxypropyl methacrylate, glycidyl methacrylate and trihydroxymethylpropyl trimethylacrylate.

The silicone-acrylic resin that meets the foregoing conditions is commercially available, for example: the SD-528 silicone-acrylic emulsion produced by Nantong Shengda Chemical Co., Ltd.

The silicone-acrylic resin that meets the foregoing conditions may also be produced by conventional polymerization method. For example, at the presence of catalyst, the organosilicon monomers and acrylic-based monomers and/or acrylate-based monomers are copolymerized in solvent. Conventional catalysts, solvents and copolymerization conditions may be adopted.

The styrene-acrylic resin and silicone-acrylic resin may be resin or waterborne emulsion or waterborne dispersion. The amount of water soluble organic resins is calculated based on dry weight. In the waterborne emulsion, the content of resin may be 40-60 wt % of the total weight of the emulsion.

Water soluble acrylic resin is polymerized from acrylic-based monomers. The acrylic-based monomer may be one or more of acrylic acid, methacrylic acid and trimethacrylic acid. Its molecular weight may vary in a very large range. For example, the weight-average molecular weight of water soluble acrylic resin may be 2000-300000 and preferably 8000-11000.

The water soluble acrylic resin that meets the foregoing conditions is commercially available, for example, EA3842 water soluble acrylic resin produced by Jiangsu Sanmu Group Co., Ltd.

The water soluble acrylic resin that meets the foregoing conditions may also be produced by conventional polymerization method, for example: at the presence of catalyst, acrylic-based monomers are copolymerized in solvent. Conventional catalysts, solvents and polymerization conditions may be adopted.

The present invention also provides a method to prepare the foregoing passivant for hot-dip Al—Zn-coated sheet. The method includes the following steps:
 a. Adding and dissolving 2~6 parts by weight of water soluble molybdate and 4~12 parts by weight of water soluble manganese salt into deionized water;
 b. Adding 50~100 parts by weight of basic silica sol into the solution obtained in step a and mixing well;
 c. Adding 50~100 parts by weight of water soluble organic resin into the solution obtained in step b and mixing well;
 d. regulating the pH value of the solution obtained in step c to 5~8 by using phosphoric acid, such that the passivant for hot-dip Al—Zn-coated sheet is obtained.

Further, the foregoing water soluble molybdate may be any molybdate, such as: at least one of sodium molybdate, ammonium molybdate and potassium molybdate. The foregoing water soluble manganese salt may be any water soluble manganese salt, such as: at least one of manganese dihydrogen phosphate, manganese sulfate, manganese chloride and manganese nitrate; manganese dihydrogen phosphate is preferred. The preferred basic silica sol is the basic silica sol containing 20~40 wt % silicon dioxide. The foregoing water soluble organic resin may adopt a common water soluble organic resin, such as: at least one of water soluble styrene-acrylic resin emulsion, water soluble silicone-acrylic emulsion and water soluble acrylic resin.

The desirable concentration of the passivant for hot-dip Al—Zn-coated sheet as prepared in step d is: the concentration of molybdate is 2~6 g/L, the concentration of water soluble manganese salt is 4~12 g/L, the concentration of basic silica sol is 50~100 g/L and the concentration of water soluble organic resin is 50~100 g/L. That is to say, relative to 1 L of the passivant for hot-dip Al—Zn-coated sheet, the amount of molybdate is 2~6 g, the amount of water soluble manganese salt is 4~12 g, the amount of basic silica sol is 50~100 g, the amount of water soluble organic resin is 50~100 g, and the amount of deionized water makes the ultimate volume of the passivant for hot-dip Al—Zn-coated sheet be 1 L. Water soluble organic resin is used typically in form of aqueous emulsion. The concentration of the water soluble organic resin in the passivant is calculated based on the solid content of aqueous emulsion. In other words, the multiplication of aqueous emulsion and the solid content of aqueous emulsion is the amount of the water soluble organic resin.

The present invention also provides the hot-dip Al—Zn-coated sheet treated with the foregoing passivant.

Further, the present invention also provides a method to passivate hot-dip Al—Zn-coated sheet. The method adopts the foregoing passivant for hot-dip Al—Zn-coated sheet.

Further, the foregoing method to passivate hot-dip Al—Zn-coated sheet includes the following steps: firstly, hot-dip Al—Zn-coated sheet are degreased and cleaned, then the passivant for hot-dip Al—Zn-coated sheet is applied on the surface of the hot-dip Al—Zn-coated sheet and then is dried by heating (typical heating temperature: 70~150° C.). There is no particular limitation to the application method and application amount of the passivant. For example, roller coating method may be adopted. The application amount of the passivant may be such that the amount of dried film is 50-5000 mg/m$^2$, preferably 100-3000 mg/m$^2$ and more preferably 500-2000 mg/m$^2$.

The passivant of the present invention for hot-dip Al—Zn-coated sheet has the following advantages: It does not contain chromium or any other heavy metal ions that may pollute environment, so it is environment-friendly; it has a low film forming temperature (70~150° C.), good corrosion resistance and good water resistance and meanwhile may improve the appearance of hot-dip Al—Zn-coated sheet and enhance the lubricating performance of the film. The passivant of the present invention for hot-dip Al—Zn-coated sheet is characterized by simple production process, low cost and easy-to-use, provides a new option for this field and has a broad application prospect.

DETAILED DESCRIPTION OF THE EMBODIMENTS

The present invention is further described below in connection with specific embodiments. However, the present invention shall not be therefore limited to the examples.

Example 1

Add 2 g of ammonium molybdate into 500 ml of deionized water and stir and dissolve it;

Add 4 g of manganese dihydrogen phosphate under agitation and stir and dissolve it;

Add 80 g of basic silica sol containing 25.14 wt % silicon dioxide and stir evenly;

Add 90 g of water soluble acrylic resin (EA3842, water soluble acrylic resin provided by Jiangsu Sanmu Group Co., Ltd., solid content 60±1%);

Add deionized water until the total volume reaches to 1 L;

Use phosphoric acid to regulate the pH value of the solution to 5, such that the passivant of the present invention for hot-dip Al—Zn-coated sheet is obtained.

Use a roller to apply the passivant of the present invention for hot-dip Al—Zn-coated sheet onto the degreased and cleaned surface of hot-dip Al—Zn-coated sheets, and heat and dry it at 90° C. to form a colorless and transparent passivated film. The thickness of the film: 960 mg/m$^2$.

Take the foregoing passivated hot-dip Al—Zn-coated sheet and unpassivated hot-dip Al—Zn-coated oiled sheet as samples to perform neutral salt spray test and water resistance test. The result is as follows:

(1) In the neutral salt spray test, black rust appeared on the surface of the samples of the unpassivated hot-dip Al—Zn-coated oiled sheets averagely 8 h later, while black rust did appear on the surface of the samples of the passivated hot-dip Al—Zn-coated sheets until averagely 88 h later;

(2) Dropwise add about 2 ml of 100° C. boiling water onto the surface of a horizontal sample, and observe water prints after 24 hours' natural drying. Neither the samples of the passivated hot-dip Al—Zn-coated sheet nor the samples of the unpassivated hot-dip Al—Zn-coated oiled sheet had water prints at the tested locations, indicating that the coats have good water resistance.

Example 2

Add 4 g of ammonium molybdate into 500 ml of deionized water and stir and dissolve it;

Add 8 g of manganese dihydrogen phosphate under agitation and stir and dissolve it;

Add 100 g of basic silica sol containing 26.84 wt % silicon dioxide and stir evenly;

Add 160 g of water soluble styrene-acrylic emulsion (A-101, styrene-acrylic emulsion provided by Nantong Lianbang Chemical Co., Ltd., solid content 47±1%);

Add deionized water until the total volume reaches to 1 L;

Use phosphoric acid to regulate the pH value of the solution to 6, such that the passivant of the present invention for hot-dip Al—Zn-coated sheet is obtained.

Use a roller to apply the passivant of the present invention for hot-dip Al—Zn-coated sheet onto the degreased and cleaned surface of hot-dip Al—Zn-coated sheets, and heat and dry it at 80° C. to form a colorless and transparent passivated film. The thickness of the film: 1000 mg/m$^2$.

Take the foregoing passivated hot-dip Al—Zn-coated sheet and unpassivated hot-dip Al—Zn-coated oiled sheet as samples to perform neutral salt spray test and water resistance test. The result is as follows:

(1) In the neutral salt spray test, black rust appeared on the surface of the samples of the unpassivated hot-dip Al—Zn-coated oiled sheets averagely 8 h later, while black rust did not appear on the surface of the samples of the passivated hot-dip Al—Zn-coated sheets until averagely 92 h later;

(2) Dropwise add about 2 ml of 100° C. boiling water onto the surface of a horizontal sample, and observe water prints after 24 hours' natural drying. Neither the samples of the passivated hot-dip Al—Zn-coated sheet nor the samples of the unpassivated hot-dip Al—Zn-coated oiled sheet had water prints at the tested locations, indicating that the coats have good water resistance.

Example 3

Add 6 g of sodium molybdate into 500 ml of deionized water and stir and dissolve it;

Add 12 g of manganese dihydrogen phosphate under agitation and stir and dissolve it;

Add 100 g of basic silica sol containing 26.84 wt % silicon dioxide and stir evenly;

Add 200 g of water soluble silicone-acrylic emulsion (SD-528, silicone-acrylic emulsion provided by Nantong Shengda Chemical Co., Ltd., solid content 45±2%);

Add deionized water until the total volume reaches to 1 L;

Use phosphoric acid to regulate the pH value of the solution to 6, such that the passivant of the present invention for hot-dip Al—Zn-coated sheet is obtained.

Use a roller to apply the passivant of the present invention for hot-dip Al—Zn-coated sheet onto the degreased and cleaned surface of hot-dip Al—Zn-coated components, and heat and dry it at 70° C. to form a colorless and transparent passivated film. The thickness of the film: 1200 mg/m$^2$.

Take the foregoing passivated hot-dip Al—Zn-coated sheet and unpassivated hot-dip Al—Zn-coated oiled sheet as samples to perform neutral salt spray test and water resistance test. The result is as follows:

(1) In the neutral salt spray test, black rust appeared on the surface of the samples of the unpassivated hot-dip Al—Zn-coated oiled sheet averagely 8 h later, while black rust did not appear on the surface of the samples of the passivated hot-dip Al—Zn-coated sheet until averagely 84 h later;

(2) Dropwise add about 2 ml of 100° C. boiling water onto the surface of a horizontal sample, and observe water prints after 24 hours' natural drying. Neither the samples of the passivated hot-dip Al—Zn-coated sheet nor the samples of the unpassivated hot-dip Al—Zn-coated oiled sheet had water prints at the tested locations, indicating that the coats have good water resistance.

What is claimed is:

1. A passivant for hot-dip Al—Zn-coated sheet, wherein its raw materials consist of: 2~6 parts by weight of water soluble molybdate, 4~12 parts by weight of water soluble manganese salt, 50~100 parts by weight of basic silica sol and 50~100 parts by weight of water soluble organic resin.

2. The passivant for hot-dip Al—Zn-coated sheet according to claim 1, wherein the water soluble molybdate is selected from the group consisting of sodium molybdate, ammonium molybdate and potassium molybdate; the water soluble manganese salt is selected from the group consisting of manganese dihydrogen phosphate, manganese sulfate, manganese chloride and manganese nitrate.

3. The passivant for hot-dip Al—Zn-coated sheet according to claim 1, wherein the basic silica sol is a basic silica sol containing 20~40 wt % silicon dioxide.

4. The passivant for hot-dip Al—Zn-coated sheet according to claim 1, wherein the water soluble organic resin is selected from the group consisting of water soluble styrene-acrylic resin emulsion, water soluble silicone-acrylic emulsion and water soluble acrylic resin.

5. A method to prepare a passivant for hot-dip Al—Zn-coated sheet, wherein the method comprises the following:
 a. Adding and dissolving 2~6 parts by weight of water soluble molybdate and 4~12 parts by weight of water soluble manganese salt into deionized water;
 b. Adding 50~100 parts by weight of basic silica sol into the solution obtained in operation a and mixing well;
 c. Adding 50~100 parts by weight of water soluble organic resin into the solution obtained in operation b and mixing well;
 d. regulating the pH value of the solution obtained in operation c to 5~8 by using phosphoric acid, such that the passivant for hot-dip Al—Zn-coated sheet is obtained wherein the raw materials of the passivant consist of 2~6 parts by weight of water soluble molybdate, 4~12 parts by weight of water soluble manganese salt, 50~100 parts by weight of basic silica sol, and 50~100 parts by weight of water soluble organic resin.

6. The method according to claim 5, wherein the water soluble molybdate is at least one of sodium molybdate, ammonium molybdate and potassium molybdate; the water soluble manganese salt is at least one of manganese dihydrogen phosphate, manganese sulfate, manganese chloride and manganese nitrate; the basic silica sol is a basic silica sol containing 20~40 wt % silicon dioxide; the water soluble organic resin is at least one of water soluble styrene-acrylic resin emulsion, water soluble silicone-acrylic emulsion and water soluble acrylic resin.

7. The hod according to claim 5, wherein in the passivant for hot-dip Al—Zn-coated sheet obtained in operation d, the concentration of the water soluble molybdate is 2~6 g/L, the concentration of the water soluble manganese salt is 4~12 g/L, the concentration of the basic silica sol is 50~100 g/L and the concentration of the water soluble organic resin is 50~100 g/L.

8. A hot-dip Al—Zn-coated sheet treated with a passivant for hot-dip Al—Zn-coated sheet, wherein the raw materials of the passivant consist of: 2~6 parts by weight of water soluble molybdate, 4~12 parts by weight of water soluble manganese salt, 50~100 parts by weight of basic silica sol and 50~100 parts by weight of water soluble organic resin.

9. A method to passivate hot-dip Al—Zn-coated sheet, wherein it comprises an operation of treating the sheet with a passivant for hot-dip Al—Zn-coated sheet, wherein the raw materials of the passivant consist of: 2~6 parts by weight of water soluble molybdate, 4~12 parts by weight of water soluble manganese salt, 50~100 parts by weight of basic silica sol and 50~100 parts by weight of water soluble organic resin.

10. The method according to claim 9, wherein firstly, hot-dip Al—Zn-coated sheet are degreased and cleaned, and then the passivant for hot-dip Al—Zn-coated sheet is applied on the surface of the hot-dip Al—Zn-coated sheet and is dried by heating.

11. The passivant for hot-dip Al—Zn-coated sheet according to claim 2, wherein the basic silica sol is a basic silica sol containing 20~40 wt % silicon dioxide.

12. The passivant for hot-dip Al—Zn-coated sheet according to claim 2, wherein the water soluble organic resin is selected from the group consisting of water soluble styrene-acrylic resin emulsion, water soluble silicone-acrylic emulsion and water soluble acrylic resin.

13. The passivant for hot-dip Al—Zn-coated sheet according to claim 11, wherein the water soluble organic resin is selected from the group consisting of water soluble styrene-acrylic resin emulsion, water soluble silicone-acrylic emulsion and water soluble acrylic resin.

* * * * *